Patented May 16, 1933

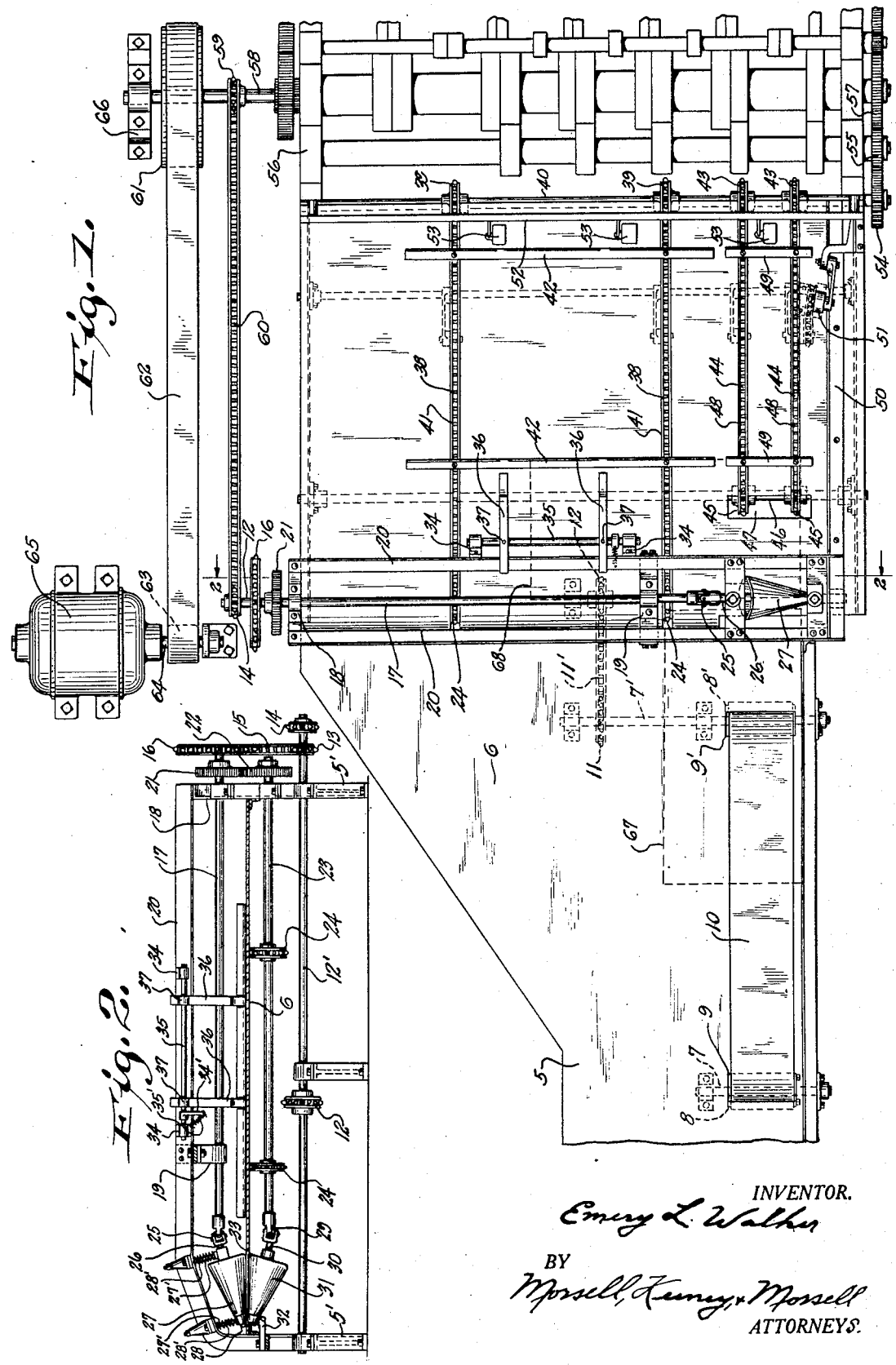

1,909,439

UNITED STATES PATENT OFFICE

EMERY L. WALKER, OF WAUWATOSA, WISCONSIN, ASSIGNOR TO KIECKHEFER CONTAINER COMPANY, OF MILWAUKEE, WISCONSIN, A CORPORATION OF MAINE

SHEET CONVEYER

Application filed May 18, 1929. Serial No. 364,294.

This invention relates to improvements in sheet conveyers.

In box making devices where sheets of material are being conveyed with a certain edge forward, it is sometimes necessary to have said sheets turned at right angles to their former position, so that they will enter a machine with a different edge forward.

It is one of the objects of the present invention to provide an improved sheet conveyer having means for turning said sheets while they are being conveyed.

It is a further object of this invention to provide an improved sheet conveyer which is simple in construction and operation and well adapted for the purpose described.

With the above and other objects in view, the invention consists of the improved sheet conveyer and all its parts and combinations, as set forth in the claims, and all equivalents thereof.

In the accompanying drawing, in which the same reference numerals designate the same parts in all of the views, Fig. 1 is a plan view of the improved conveyer, showing it in attachment with a box making machine, parts being broken away; and Fig. 2 is a sectional view taken on the line 2—2 of Fig. 1.

Referring to the drawing, the numeral 5 designates a conveyer platform, which is widened as at 6. Said conveyer platform is supported by suitable legs 5'. Journaled below the platform 5 are spaced apart shafts 7 and 7' carrying rollers 8 and 8', respectively. Above the rollers the platform is provided with openings 9 and 9', through which an endless belt 10, connecting the rollers, extends.

The shaft 7' is provided with a sprocket wheel 11 which is connected by an endless chain 11' with a sprocket wheel 12 mounted on a transversely journaled shaft 12'. The latter shaft is provided on one end with rigidly mounted sprocket wheels 13 and 14. The sprocket wheel 13 is connected by an endless chain 15 with a sprocket wheel 16 mounted rigidly on one end of a shaft 17. The latter shaft is journaled in a bearing bracket 18 and in a bearing 19, the latter bearing projecting from transverse frame members 20. Also rigidly mounted on the shaft 17 is a gear 21 which meshes with a gear 22 rigidly mounted on a shaft 23. The latter shaft is journaled below the platform, and carries loosely mounted sprocket wheels 24.

The inner end of the shaft 17 is connected by a universal joint connection 25 with a shaft 26 extending from a cone roller 27. The tip portion of the cone is rotatable in a bearing 28 extending from the platform. Coil springs 27' are mounted on pins 28', the latter extending between the frame members 20 and the cone roller 27. The inner end of the shaft 23 is connected by a universal joint 29 with a shaft 30 extending from a lower cone roller 31, the latter roller having its tip rotatably positioned in a bearing portion 32. Above the cone roller 31, the platform 6 is provided with an opening 33.

Extending from the transverse frame members 20 are bearings 34, within which a rod 35 is journaled. The said rod has drag members 36 extending downwardly therefrom and secured thereto as at 37. An arm 34' has one end secured to the rod 35, and has its other end connected by a spring 35' with the frame members 20. The said spring tends to hold the drag members in engagement with the platform.

The sprocket wheels 24 are connected by endless chains 38 with sprocket wheels 39 rigidly mounted on a shaft 40, the said shaft being journaled transversely of the frame at one end thereof. The endless chains 38 travel in slots 41 in the platform portion, and carry pusher bars 42.

Sprocket wheels 43 are also rigidly mounted on the shaft 40, and are connected by endless chains 44 with sprocket wheels 45 rigidly mounted on a shaft 46. Above the sprocket wheels 45, the platform is provided with an opening 47. The endless chains 44 travel in slots 48 and carry pusher bars 49. At one side of the platform is an angle member 50, and adjacent thereto is a "crowder" roller 51 which is supported at an angle, and which is adapted to bring the sheets so that their side edges are in alinement with the angle bar 50.

Supported from a transverse bar 52, which is spaced above the platform, are drag brushes 53, which are adapted to engage the sheets to maintain them flat on the platform.

On one end of the shaft 40 is a rigidly mounted gear 54, which engages a gear 55 on a blank forming machine 56. The gear 55 meshes with a gear 57 mounted on a shaft 58. On the other end of the shaft 58 is a rigidly mounted sprocket wheel 59, which is connected by an endless chain 60 with the sprocket wheel 14 on the shaft 12'. A pulley 61 is also rigidly mounted on the same end of the shaft 58. Said pulley is connected by an endless belt 62 with a pulley 63 on a shaft 64 extending from a driving motor 65. The end of the shaft 58, carrying the sprocket wheel 59 and the pulley 61, is journaled in a bearing 66. The operation of the device is, as follows:

A sheet of material, which is indicated by the dotted lines 67, is conveyed longitudinally of the platform 5 by the endless belt 10. The said sheet has a short edge forward. When said short edge of the sheet passes between the cone rollers 27 and 31, the sheet is caused to turn at right angles and to assume the position indicated by the dotted lines 68. This is caused by the peculiar shape of the rollers 27 and 31. As the rollers are rotating at a high speed, the sheet is thrown to its new position with considerable force. However, due to the drag members 36, which engage the sheet, its movement is retarded, and it is then ready to be engaged by the pusher bars 42 and 49 and conveyed to the blank forming machine 56. As the sheet is being carried by said pusher bars, one edge is engaged by the "crowder" roller 51, and due to the angle at which the latter is positioned, the sheet is crowded closely against the angle member 50, so that it is in proper alinement for entering the blank forming machine.

It is to be understood that this conveyer with the improved sheet turning device may be used in conjunction with any type of machine in which it is rendered necessary. In the drawing it is shown as used in connection with the blank forming machine 56, a portion only of said machine being shown, and said machine being indicated roughly.

Although only one form of the device has been shown, it is not desired that it be limited to the exact showing, and it is to be understood that all such modifications and changes are contemplated as may fairly come within the scope of the claims.

What I claim is:

1. A sheet conveyer comprising a supporting frame, means for moving sheets of material therealong, a pair of cone-shaped rollers rotatably mounted in said frame and arranged to receive sheets of material therebetween and to turn said sheets at an angle to their former position as they are being conveyed, and drag members engageable with top surfaces of said sheets after they have been turned to retard their movement.

2. A sheet conveyer comprising a supporting frame, means for moving sheets of material therealong, a pair of cone-shaped rollers rotatably mounted in said frame and arranged to receive sheets of material therebetween and to turn said sheets at an angle to their former position as they are being conveyed, and drag members mounted over the frame and yieldingly engageable with top surfaces of said sheets after they have been turned to retard their movement.

3. A sheet conveyer comprising a supporting frame, means for moving sheets of material therealong, means for turning said sheets at an angle to their former position as they are being conveyed, and pivotally mounted drag members engageable with said sheets after they have been turned to retard their movement.

4. A sheet conveyer comprising a supporting frame, means for moving sheets of material therealong, means for turning said sheets at an angle to their former position as they are being conveyed, and pivotally and yieldingly mounted drag members engageable with said sheets after they have been turned to retard their movement.

5. A sheet conveyer comprising a supporting platform, means in connection with said platform for turning sheets at an angle to their former position, means for conveying sheets to said turning means, main conveying mechanism for advancing the sheets after they have been turned, and auxiliary conveying mechanism engageable adjacent one side of the sheets after they have been turned for preventing said side from dragging.

6. A sheet conveyer comprising a supporting platform, means in connection with said platform for turning sheets at an angle to their former position, means for conveying sheets to said turning means, means engageable with top surface portions of said sheets after they have been turned for retarding their movement, and means engageable with the retarded sheets for uniformly advancing the latter.

In testimony whereof, I affix my signature.

EMERY L. WALKER.